Oct. 26, 1926.

W. KONONAN

AUTOMOBILE BUMPER

Filed July 14, 1925    2 Sheets-Sheet 1

1,604,173

INVENTOR
William Kononan
by *William B. Wharton*
his attorney

Oct. 26, 1926.

W. KONONAN

AUTOMOBILE BUMPER

Filed July 14, 1925   2 Sheets-Sheet 2

1,604,173

INVENTOR
William Kononan
by William B. Wharton
his attorney

Patented Oct. 26, 1926.

1,604,173

UNITED STATES PATENT OFFICE.

WILLIAM KONONAN, OF PITTSBURGH, PENNSYLVANIA.

AUTOMOBILE BUMPER.

Application filed July 14, 1925. Serial No. 43,445.

This invention relates to an automobile bumper.

General objects of the invention are to provide an automobile bumper which is provided with resilient members for absorbing the shock of a collision between the automobile to which the bumper is applied and any other object, and to provide means whereby compression of such resilient members results in setting the brake and throwing out the clutch of the automobile. This latter feature is of importance in the event that the automobile suffer a collision in heavy traffic, or on the edge of a cliff or embankment and if in such case the operator of the automobile should become confused or the steering mechanism impaired by the collision.

A more specific object of the invention is to provide a bumper having the general features noted, which is simple and sturdy in construction, and which is of attractive appearance.

Another specific object of the invention is to provide a bumper of the nature indicated in which the connections for operating the brake and clutch are so arranged that the brake is set and the clutch thrown out before the resilient members of the bumper have been compressed to their limit.

A further specific object of the invention is to provide means whereby the clutch is locked in disengaging position and the brake locked, while permitting the engine of the automobile to continue in operation.

Figure 1:
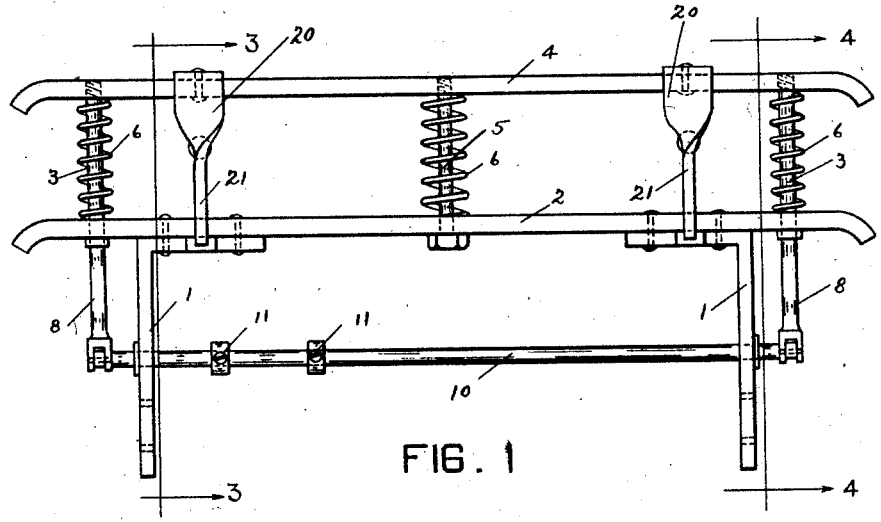
Figure 2:
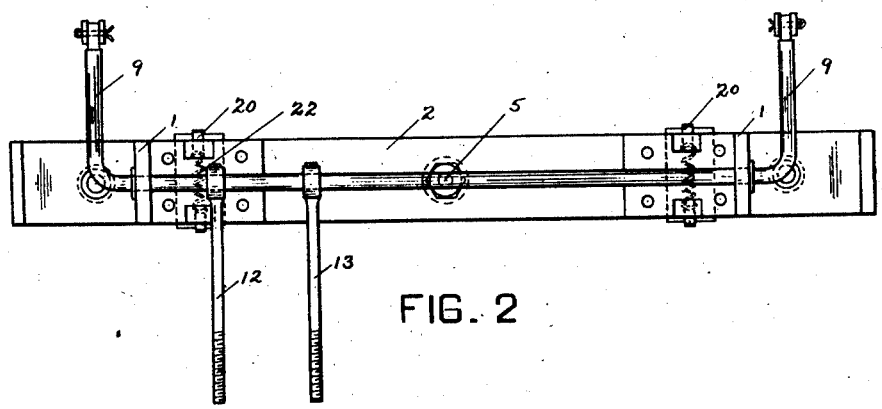
Figure 3:
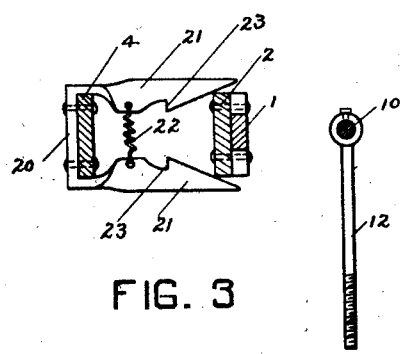
Figure 4:
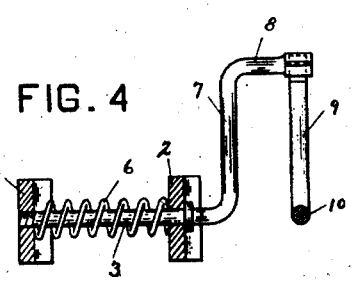
Figure 6:
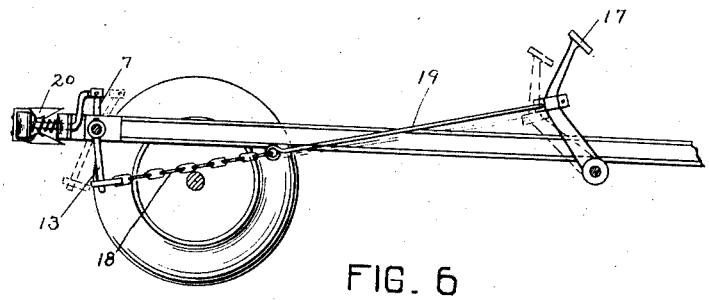
Figure 5:
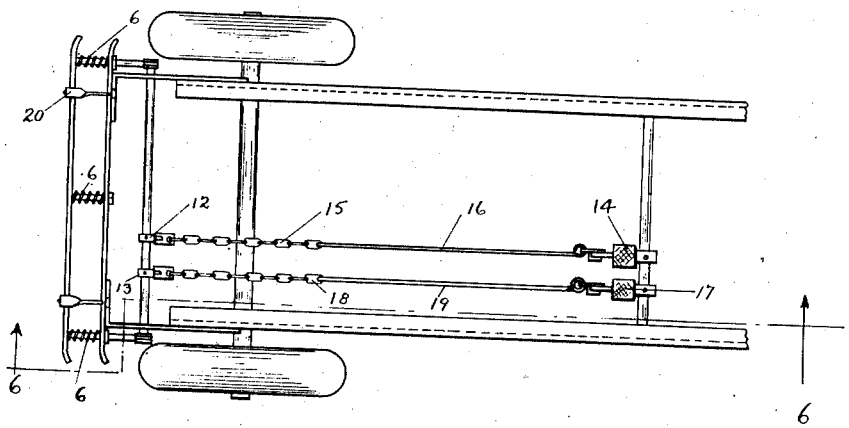
Figure 7:
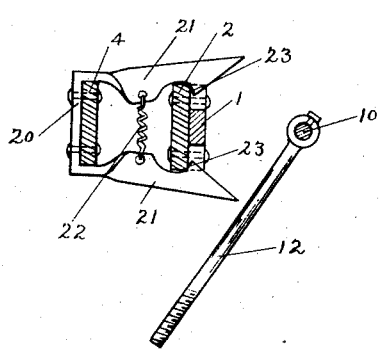
Figure 8:
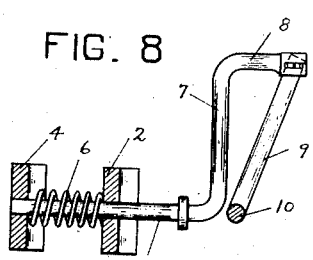

In the accompanying drawings Figure 1 is a plan view of the bumper; Figure 2 is a rear elevation of the same; Figure 3 is a cross sectional detail view on the line 3—3 Figure 1; Figure 4 is a cross sectional detail view on the line 4—4 Figure 1; Figure 5 is a plan view of the forward portion of the chassis of an automobile, showing the connections between the bumper and the brake and clutch of the automobile; Figure 6 is a vertical sectional view on the line 6—6 Figure 5; Figure 7 is a cross sectional detail, showing the elements shown in Figure 3, but illustrating the position of the parts with the forward bumper bar in its most rearward position with the brake set and the clutch disengaged; and Figure 8 is a cross sectional detail showing the elements shown in Figure 4, but illustrating the position of the parts rearward position with the brake set and the clutch disengaged.

In the drawings the reference numeral 1 designates L-shaped frame or supporting members for the bumper, arranged to be bolted or riveted to the chassis of the automobile. To one leg of these L-shaped members 1 is riveted a bumper bar 2. Slidably mounted in the bumper bar 2 is a pair of rods 3, which are secured at their forward extremity to the forward or movable bumper bar 4. A third rod 5, disposed between the rods 3, is also secured at its forward extremity to the movable bumper bar 4, and is slidable in the rearward or stationary bar 2. Coiled springs 6 surround the rods 3 and the rod 5, and bear against the forward bumper bar 4 and the rearward bumper bar 2. These springs are preferably made of relatively great strength, and as they are compressed upon rearward movement of the forward bumper bar they tend to resist such rearward movement.

As so far described, the bumper serves to cushion blows due to a head-on or glancing collision with any stationary or moving object. Connections are also provided, however, by which the brake of the automobile to which the bumper is applied is set, and its clutch disengaged, upon such collision.

Connections for effecting the above noted purposes comprise the rods 3 secured to the forward bumper bar. Rearwardly of the stationary bar 2 these rods 3 are extended upwardly throughout the length 7 and rearwardly throughout the length 8. To each of the portions 8 of the rods 3, adjacent its rearward extremity, is secured one of the legs 9 of a U-shaped operating bar 10, which is rotatably mounted in the rearwardly extending legs of the L-shaped supporting members 1. Secured on the operating arm 10, as by set screws 11, are a pair of actuating rods 12 and 13. These actuating rods 12 and 13 are of considerably greater length than the legs 9 of the operating bar 10.

When the forward bumper bar 4 is forced rearwardly toward the stationary bar 2, under the impact of collision, the rearward movement of the rods 3 produces a partial rotation of the operating bar 10 and actuating rods 12 and 13 forwardly of the automobile. For transmitting this movement to the brake and clutch of the automobile, one of the actuating rods 12 is connected to the brake pedal 14 by means of a flexible connection, such as the chain 15, and a rigid connection, such as the rod 16. The other actuating rod 13 is secured to the clutch pedal 17 by means of a flexible connection, such as the chain 18, and by a rigid connection, such as the rod 19. Forwardly rotating movement of the operating arm and actuating rods, produced as described, thus results in setting the brake of the automobile, and in disengaging the clutch thereof.

It should be noted that the connections are such, and the strength of the springs 6 should be such, that the brake is set and the clutch disengaged before the limit of rearward movement of the movable bumper bar 4 has been reached. In order to increase the effective movement on the brake and clutch pedals, it is desirable that the actuating rods 12 and 13 be made as long as is practicable with consideration to their strength and the clearance beneath the body of the automobile.

It should be further noted that the action transmitted by rods 12 and 13 produces disengagement of the clutch of the automobile rather than having an effect upon the spark of fuel supply for the engine thereof. This gives an increased assurance of proper action upon striking an obstacle, because the engine might continue to run for an appreciable length of time after disconnection of the spark or attempted stoppage of the fuel supply.

As the engine of the automobile continues in operation, it is desirable that the brake be locked in set position and the clutch in disengaged position, in order to avoid possibility of restarting at an inopportune time due to confusion on the part of the operator of the automobile to which the bumper is applied. For this purpose two catch or locking members 20 are secured to the forward bumper bar 4 and arranged to engage the rearward bumper bar 2. Each of the catch or locking members comprises an integral body member 20 of resilient metal, and having arms 21 extending rearwardly therefrom. These arms are mutually connected by means of a coiled spring 22, and are provided with barbs 23 so arranged that upon rearward movement of the movable bumper bar 4, under the impact of a collision, one or both of the catch members 20 are forced rearwardly a sufficient distance for their barbs 23 to engage the stationary bumper bar 2. This engagement locks the forward bumper bar in rearward position, and thereby also locks the various connections in position to maintain the brake of the automobile set and the clutch disengaged. It will be understood that, owing to the strength of the coiled springs 3, a relatively slight impact will not produce this locking; but that a heavy blow such as would be reasonably expected to occur in dangerous situations would automatically lock the brake and clutch in position to prevent renewed movement of the automobile.

It will be observed that the bumper construction as a whole is of pleasing appearance, presenting few differences from standard types of bumper which will appear to a casual observer; and that the general construction of the bumper is sturdy and comprises relatively few operating parts.

What I claim is:

1. An automobile bumper construction comprising a stationary bumper bar and a movable bumper bar disposed forwardly of the stationary bar, resilient means exerting a force tending to resist rearward movement of the movable bar toward the stationary bar, connections secured to said movable bumper bar and extending rearwardly and upwardly therefrom, a U-shaped operating bar having its legs secured to said connections, rods secured to said operating bar and of greater length than the legs of the operating bar for increasing their effective rotative movement, and connections from said rods to the brake and clutch of the automobile.

2. An automobile bumper construction comprising a stationary bumper bar and a movable bumper bar disposed forwardly of the stationary bar, resilient means exerting a force tending to resist rearward movement of the movable bumper bar toward the stationary bar, connections secured to said movable bumper bar and extending rearwardly and upwardly therefrom, a U-shaped operating bar having its legs secured to said connections, rods secured to said operating bar and of greater length than the legs of the operating bar for increasing their effective rotative movement, connections from said rods to the brake and clutch of the automobile, and means carried by the movable bumper bar for locking the parts in position with the brake engaged and the clutch disengaged while permitting operation of the engine of the automobile.

In witness whereof, I hereunto set my hand.

WILLIAM KONONAN.